UNITED STATES PATENT OFFICE.

L. OTTO P. MEYER, OF NEWTOWN, CONNECTICUT.

IMPROVEMENT IN THE MANUFACTURE OF HARD RUBBER OR VULCANITE WITH CLOTH SURFACE.

Specification forming part of Letters Patent No. 153,450, dated July 28, 1874; application filed April 24, 1874

CASE D.

*To all whom it may concern:*

Be it known that I, L. OTTO P. MEYER, of Newtown, Fairfield county, and State of Connecticut, have invented a new Manufacture of Hard Rubber or Vulcanite with Cloth Surface, of which the following is a specification:

Prior to my said invention the attempt was frequently made to produce vulcanite or hard rubber coated or faced with cloth, but without success. What is known as soft and flexible rubber was successfully so coated, and known as vulcanized rubber cloth, but vulcanite could not be so produced.

I have successfully produced, and my said invention of a new manufacture consists of, vulcanite or hard rubber coated or faced with cloth.

The process by which I have successfully produced my new manufacture is described in an application of even date with this for separate Letters Patent for the said process.

What I claim as my invention, and desire to secure by Letters Patent, is—

The new manufacture, substantially as herein described, consisting of hard rubber or vulcanite coated or faced with cloth, as set forth.

L. OTTO P. MEYER.

Witnesses:
    B. T. VETTERLEIN,
    WM. SCOTT.